United States Patent [19]

Harrington

[11] 4,386,006

[45] May 31, 1983

[54] ION-EXCHANGE COMPOSITIONS

[75] Inventor: Donald F. Harrington, Midland, Mich.

[73] Assignee: The Dow Chemical Company, Midland, Mich.

[21] Appl. No.: 700,656

[22] Filed: Jan. 25, 1968

[51] Int. Cl.³ ............................................. C01B 31/16
[52] U.S. Cl. .................. 252/184; 252/180; 252/427; 521/30; 210/681
[58] Field of Search ............... 252/421, 426, 427, 184, 252/180; 210/24, 38 R; 521/30

[56] References Cited

U.S. PATENT DOCUMENTS

| | | | |
|---|---|---|---|
| 2,005,397 | 6/1935 | Schur | 252/427 X |
| 2,033,698 | 3/1936 | Finn | 252/427 X |
| 2,186,709 | 1/1940 | Rowland | 252/427 X |
| 2,204,539 | 6/1940 | Wassenegger et al. | 252/426 X |
| 2,505,039 | 4/1950 | Gloor | 252/426 UX |
| 2,650,184 | 8/1953 | Biefeld | 252/426 UX |
| 2,900,351 | 8/1959 | Goren et al. | 252/421 X |

*Primary Examiner*—Stephen J. Lechert, Jr.

[57] ABSTRACT

This invention relates to novel ion exchange compositions and to a method for their manufacture. Ion exchange compositions, wherein a material having ion exchange capacity is supported on a solid, water-insoluble, porous substrate, are prepared by contacting a functional vinyl monomer with such substrate and polymerizing such monomer therein to bind the polymer to the substrate by macromolecular entanglement.

8 Claims, No Drawings

ION-EXCHANGE COMPOSITIONS

This invention relates to novel ion exchange compositions and to methods for their preparation and more particularly relates to materials having ion exchange capacity supported on solid, water-insoluble, porous substrates.

It is an object of this invention to provide novel ion exchange compositions. A further object is to provide a method for the preparation of such novel ion exchange compositions. These and other objects and advantages of the present invention will become apparent from a reading of the following detailed description.

It has now been discovered that functional vinyl monomers may be polymerized within a solid, water-insoluble, porous substrate to produce a composite composition wherein the functional polymer produced is bound within the porous substrate by macromolecular entanglement.

Suitable porous substrates include fabrics, paper, porous organic polymers such as styrene-divinyl-benzene macroporous polymers and the like, porous inorganic materials such as activated alumina, silica gel, charcoal, and the like, and cloth and paper modified to contain ionic functional groups such as phosphorylated or carboxymethylated cotton. It has been found particularly advantageous to employ cotton fabrics modified by ionic functional groups and therefore these materials are usually preferred as the porous substrates for use in the present invention.

Functional vinyl monomers useful in the process and compositions of this invention include those functional vinyl aromatic monomers whose polymers possess ion exchange capacity. For example, vinyl phenylsulfonic acid, vinyl benzyl sulfonic acid, vinyl benzyl iminodiacetic acid and the vinyl benzyl quaternary ammonium compounds such as

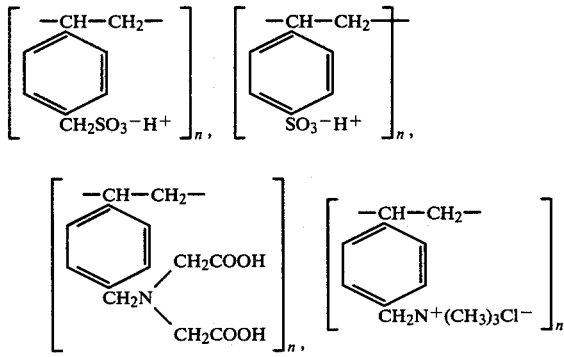

In accordance with this invention, the porous substrate is impregnated with a functional vinyl monomer containing a polymerization catalyst such that upon heating (e.g., up to about 95° C.) the monomer polymerizes within the substrate and becomes bound to such substrate by macromolecular entanglement. After polymerization, the substrate-polymer composite composition is washed with deionized water to loosen and remove all polymer which is not intertwined within the porous substrate. The ion exchange composition produced thereby is then ready for conversion to the $H^+$, $OH^-$ or other desired ion form by known methods and may be used in the same manner and for the same purposes as other forms of ion exchange materials such as continuous ion exchange and ion scavenging processes. When the porous substrate is fabric or paper, it unexpectedly was found that the appearance, feel and other physical characteristics of the fabric or paper remain substantially unchanged, yet the composition possesses excellent ion exchange capacity and therefore makes available a cloth or paper having significant ion-exchange capacity.

For purposes of greater ion capacity per unit weight, it is usually desirable to employ a comparatively high proportion of polymer with the porous substrate, usually up to the saturation point. However, proportions as low as about 5.0% are also effective to produce significant ion-exchange capacity.

The following examples are provided to more fully illustrate the invention but are not to be construed as limiting to the scope thereof.

EXAMPLE 1

A 4.65 g sample of carboxymethylated cotton lawn was immersed in a 42 weight percent aqueous solution of vinyl benzyl trimethyl ammonium chloride having a pH of 7 and containing 0.05 weight percent of $Na_2EDTA$ as a heavy metal complexing agent and $K_2S_2O_8$ as a polymerization catalyst. After a contact time of 5 minutes, the cloth was removed from the solution and drip dried in air at room temperature. The dry treated cloth was then placed in an oven in stretched condition and heated to 100° C. for 4.5 hours to cause polymerization of the vinyl monomer. After heating and polymerization, the fabric was washed to remove any excess polymer. Upon analysis, the treated cloth product was found to have a strong base capacity of 0.44 milligrams per gram but to have retained the appearance and feel of untreated cloth.

EXAMPLE 2

A 0.829 g sample of carboxymethylated cotton cloth was immersed in solution containing 6.5 g of sodium styrene sulfonate, 0.005 g of $K_2S_2O_8$ and 0.0025 g of $NaHSO_3$ in 17.5 g of water which had been purged with $N_2$ for 10 minutes to remove oxygen from the system. While the cloth was immersed therein, the solution was heated to 75° C. under a nitrogen atmosphere overnight. The treated cloth was then removed, washed with deionized water to remove any polymer not intertwined in the fabric and converted to the $H^+$ form using HCl. Upon analysis, the cloth was found to have a strong acid dry weight ion-exchange capacity of 0.36 milliequivalents per gram and to have retained the physical appearance and feel of the original cloth.

EXAMPLE 3

A sample of carboxymethylated cotton lawn cloth was placed in a 90 ml aqueous solution containing 26.5 g of vinyl benzyl iminodiacetic acid, 0.0197 g of $K_2S_2O_8$ and 0.0098 g of $NaHSO_3$. While in contact with the cloth, the mixture was heated to 75° C. for 24 hours in an atmosphere of nitrogen. The treated cotton fabric was then removed, washed, scraped and scrubbed to remove excess polymer and air dried. Analysis showed the dry weight ion-exchange capacity of the product to be 0.663 milliequivalents $H^+$ per g and 0.650 milliequivalents $Cu^{++}$ per g.

A similar experiment was conducted in the presence of air, without any $NaHSO_3$ present and employing heating for 4.5 hours at 100° C. The product had a dry weight ion-exchange capacity of 0.472 milliequivalents H+ per g.

Both products retained the appearance and feel of the original cloth substrate.

Various modifications can obviously be made within this invention without departing from the spirit or scope thereof and I therefore limit myself only as defined in the appended claims.

I claim:

1. An ion exchange composition which comprises a solid, water-insoluble, porous substrate having polymerized within the pores thereof a vinyl polymer having ion exchange capacity where the polymer is held within the porous substrate by macromolecular entanglement.

2. The composition of claim 1 wherein the porous substrate is a fabric.

3. The composition of claim 1 wherein the porous substrate is carboxymethylated cotton fabric.

4. The composition of claim 3 wherein the vinyl polymer is selected from the group consisting of polymers of vinyl benzyl trimethyl ammonium chloride, vinyl phenyl sulfonic acid, vinyl benzyl sulfonic acid, and vinyl benzyl iminodiacetic acid.

5. A process for the preparation of an ion exchange composition which comprises contacting a solid, water-insoluble, porous substrate with a vinyl monomer capable of polymerization into a polymer having ion exchange capacity, polymerizing said monomer in contact with said substrate, and washing from said porous substrate the polymer which is not attached thereto by macromolecular entanglement within the pores of said substrate.

6. The process of claim 5 wherein the porous substrate is a fabric.

7. The process of claim 5 wherein the porous substrate is carboxymethylated cotton fabric.

8. The process of claim 7 wherein the vinyl monomer is a member selected from the group consisting of vinyl phenyl sulfonic acid, vinyl benzyl sulfonic acid, vinyl benzyl iminodiacetic acid and vinyl benzyl trimethyl ammonium chloride.

* * * * *